United States Patent [19]
Obara et al.

[11] Patent Number: 5,216,566
[45] Date of Patent: Jun. 1, 1993

[54] FLOPPY DISK UNIT WITH LINER OF FIBERS CONTAINING INORGANIC OXIDE POWDER

[75] Inventors: Hiroshi Obara; Shoichi Sakamoto, both of Ibaraki; Hiroshi Ishihama, Shimotsuma, all of Japan

[73] Assignee: Hitachi Maxell, Ltd., Osaka, Japan

[21] Appl. No.: 690,573

[22] Filed: Apr. 24, 1991

[30] Foreign Application Priority Data

Apr. 24, 1990 [JP] Japan .................................. 2-106482

[51] Int. Cl.$^5$ ............................................. G11B 23/03
[52] U.S. Cl. .................................... 360/133; 360/137
[58] Field of Search ................ 360/133, 132, 135, 137

[56] References Cited

U.S. PATENT DOCUMENTS

| | | | |
|---|---|---|---|
| 4,812,938 | 3/1989 | Rogers et al. | 360/133 |
| 4,864,451 | 9/1989 | Iwasa et al. | 360/133 |
| 4,897,752 | 1/1990 | Doi et al. | 360/133 |
| 4,901,180 | 2/1990 | Oishi | 360/133 |
| 4,998,176 | 3/1991 | Takemae et al. | 360/133 |
| 5,060,105 | 10/1991 | Howey | 360/133 |

FOREIGN PATENT DOCUMENTS

| | | |
|---|---|---|
| 3812851 | 3/1988 | Fed. Rep. of Germany . |
| 53-102727 | 9/1978 | Japan .................. 360/133 B |
| 57-94965 | 6/1982 | Japan .................. 360/133 B |
| 62-16284 | 1/1987 | Japan .................. 360/133 B |

OTHER PUBLICATIONS

Patent Abstracts of Japan, vol. 6, No. 179 (P-142) Sep. 14, 1982 and JP-A-57 094 965 (Hitachi Mexell) Jun. 12, 1982, Abstract only.
Patent Abstracts of Japan, vol. 2, No. 134 (E-70) Sep. 7, 1978 and JP-A-53 102 727 (Fuji Shashin Film) Feb. 21, 1977, Abstract only.
Patent Abstracts of Japan, vol. 7, No. 70 (P-185) (1215) Mar. 23, 1983 and JP-A-58 001 864 (Akiresu) Jan. 7, 1983, Abstract only.
IBM Technical Disclosure Bulletin, vol. 22, No. 10, Mar. 1980, New York US p. 4677; D. R. Lyn: "Buff--cleaning using abrasive slurry", entire page Foreign search report.

Primary Examiner—John H. Wolff
Attorney, Agent, or Firm—Birch, Stewart, Kolasch & Birch

[57] ABSTRACT

A floppy disk unit including a cartridge case or a jacket, a flexible magnetic disk rotatably accommodated in the cartridge case or the jacket, and liners disposed on the inner surface of the cartridge case or the jacket, wherein at least the surface layer of each of the liners in sliding contact with the magnetic disk is made from a fiber material such as rayon fiber, polyamide fiber, polyester fiber, or polynosic rayon fiber, each fiber having a diameter of 10 to 30 μm, and the fiber material contains inorganic oxide material powder such as titanium oxide having an average diameter of 0.01 to 1 μm by weight ratio 0.1 to 10%.

6 Claims, 4 Drawing Sheets

FLOPPY DISK UNIT WITH LINER OF FIBERS CONTAINING INORGANIC OXIDE POWDER

BACKGROUND OF THE INVENTION

1. Field of the Invention

The present invention relates to a floppy disk (flexible disk) unit frequently used as a recording medium which is light in weight and can be handled easily, and in particular, to a liner of the floppy disk unit.

2. Description of Related Art

As already known, a floppy disk unit comprises at least a cartridge case or a jacket, a flexible magnetic disk rotatably accommodated in the cartridge case or the jacket, and liners disposed on the inner surface of the cartridge case or the jacket.

Each of the above-mentioned liners is composed of a non-woven cloth having features of electrostatic elimination of a magnetic disk for removing dusts or abrasion powder, and is required to produce little lint (small quantity of fiber dust) and to have a high cleaning feature. Therefore, there have been used in general, for example, a polyethylene terephthalate fiber, an acryl fiber and so on.

In recent times, for achieving a high density recording, there is used a magnetic layer which contains ferromagnetic metal powder, for example, pure iron, cobalt, cobalt-nickel, cobalt-phosphor and so on. Since each of these magnetic metal powders has, in general, a lower hardness in comparison with a magnetic iron oxide powder such as $\gamma$-$Fe_2O_3$ or the like, the magnetic layer suffers a severe abrasion due to the sliding contact thereof with the magnetic head. For preventing this abrasion, the magnetic layer is mixed with a reinforcing powder, for example, an aluminum oxide or the like for increasing the hardness of the magnetic layer. However, when a reinforcing powder having a greater hardness is contained in the magnetic layer as mentioned above, a problem occurs that, since the above-mentioned polyethylene terephthalate fiber or the acryl fiber is weak against abrasion, the liner is abrased due to the relative sliding motion between the magnetic disk and the liner, thereby producing liner abrasion powder which may cause errors in recording and reproducing.

In view of this problem, the present assignee has offered, in Japanese Patent Application No. 63-173724 (Japanese Patent Unexamined Publication No. 2-24888), a liner, in which at least the surface layer of the liner in sliding contact with the magnetic disk is composed of a rayon cloth in consideration not only of the low lint and high cleaning feature, but also of the durability of the liner.

As mentioned-above, when at least the surface layer of the liner in sliding contact with the magnetic disk is composed of a rayon cloth, the durability of the liner is increased in comparison with that of the liner using polyethylene terephthalate (polyesther) fiber or acryl fiber, these fibers being frequently used in the past. It has been found, however, that, when the line recording density of a magnetic disk is greater than 20 KFCI (flux-change per 2.54 cm), a small amount of liner abrasion powder, which is so small as to have caused no problem in the past, becomes a cause of errors, and that the liner using a rayon fiber has insufficient durability (because minute liner abrasion powder is generated) in such a super-high density recording.

SUMMARY OF THE INVENTION

Therefore, the object of the present invention is to solve the above-mentioned problems of the prior art, and to provide a floppy disk unit equipped with significant liners each of which has low lint and high cleaning features, as well as a superior durability of the liner, and can suppress the generation of minute liner abrasion powder as sharply as possible.

For achieving the above-mentioned object, according to the present invention, there is provided a floppy disk unit including a cartridge case or a jacket, a flexible magnetic disk rotatably accommodated in the cartridge case or the jacket, and liners mounted on the inner surface of the cartridge case or the jacket, and being characterized in that at least the surface layer of each liner in sliding contact with the magnetic disk is formed from a fiber material containing inorganic oxide material.

The present inventors have found, after conducting various experiments, that the abrasion of a liner can be sharply suppressed by forming at least the surface layer of the liner in sliding contact with the magnetic disk from a fiber material of such as rayon fiber, polyamide group fiber (nylon) or a combination of rayon fiber and polyamide group fiber, and by making the liner surface fiber contain inorganic oxide material having average diameter 0.01 to 1 $\mu$m by weight ratio 0.1 to 10% for increasing the fiber strength.

DETAILED DESCRIPTION OF THE PREFERRED EMBODIMENT

Figure 1:
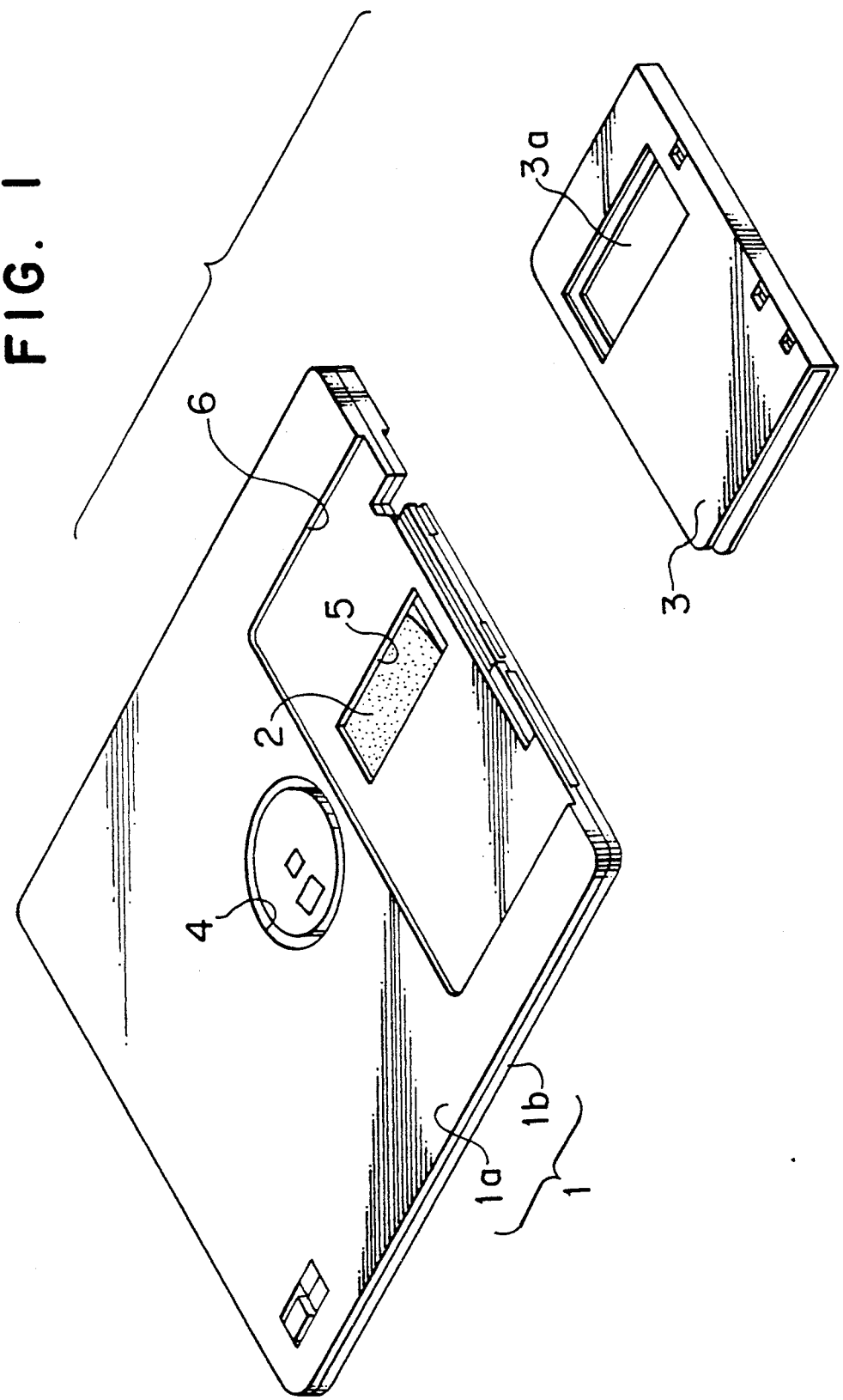
FIG. 1 is a perspective view of a floppy disk unit according to the present invention in a condition where a shutter is separated.

Preferred embodiments of the present invention will be described below.

FIGS. 1 to 5 show a floppy disk unit according to an embodiment of the present invention.

This embodiment relates to a 3.5 inch (8.9 cm) floppy disk accommodating a magnetic disk of about 3.5 inches diameter in a hard cartridge case. However, the present invention can be applied, of course, to floppy disk units accommodating a magnetic disk having a diameter such as 3 inches, 2.5 inches or 2 inches in the hard case, and also to floppy disks each accommodating a magnetic disk in a jacket made of a hard vinyl chloride sheet or the like.

A floppy disk unit is mainly composed of a cartridge case 1, a magnetic disk 2 rotatably accommodated in the cartridge case 1, liners 10 mounted on the upper and lower inner surfaces of the cartridge case 1, respectively, and a shutter 3 slidably mounted on the cartridge case 1.

The cartridge case 1 is composed of an upper case 1a and a lower case 1b, each of which is formed, for example, by injection molding of a hard synthetic resin, for example, such as ABS resin. The magnetic disk 2 includes a center hub having a well-known shape and a disk portion composed of a flexible circular disk-shaped base film which is made from polyester or polyimide and secured to the center hub, and of magnetic layers on both surfaces of the base film.

At the substantially central portion of the lower case 1b is bored a central hole 4 to be inserted with a known disk driving hub, and the upper case 1a and the lower case 1b are respectively formed with head windows 5, 5 at positions corresponding to the position of the shutter 3. As shown in FIG. 1, the upper and lower cases 1a, 1b are respectively formed with recess portions 6, which limit the motion range of the shutter 3 so that the shutter can slide within this motion range defined by the recesses 6. The shutter 3 is always applied with a biased force of a spring in the head closing direction, whereby the head window 5 is closed when no in use and is opened when the magnetic disk unit is inserted into the disk drive device, by sliding the shutter against the biased force of the spring to a position where the shutter window 3a coincides with the head window 5.

Figure 2:
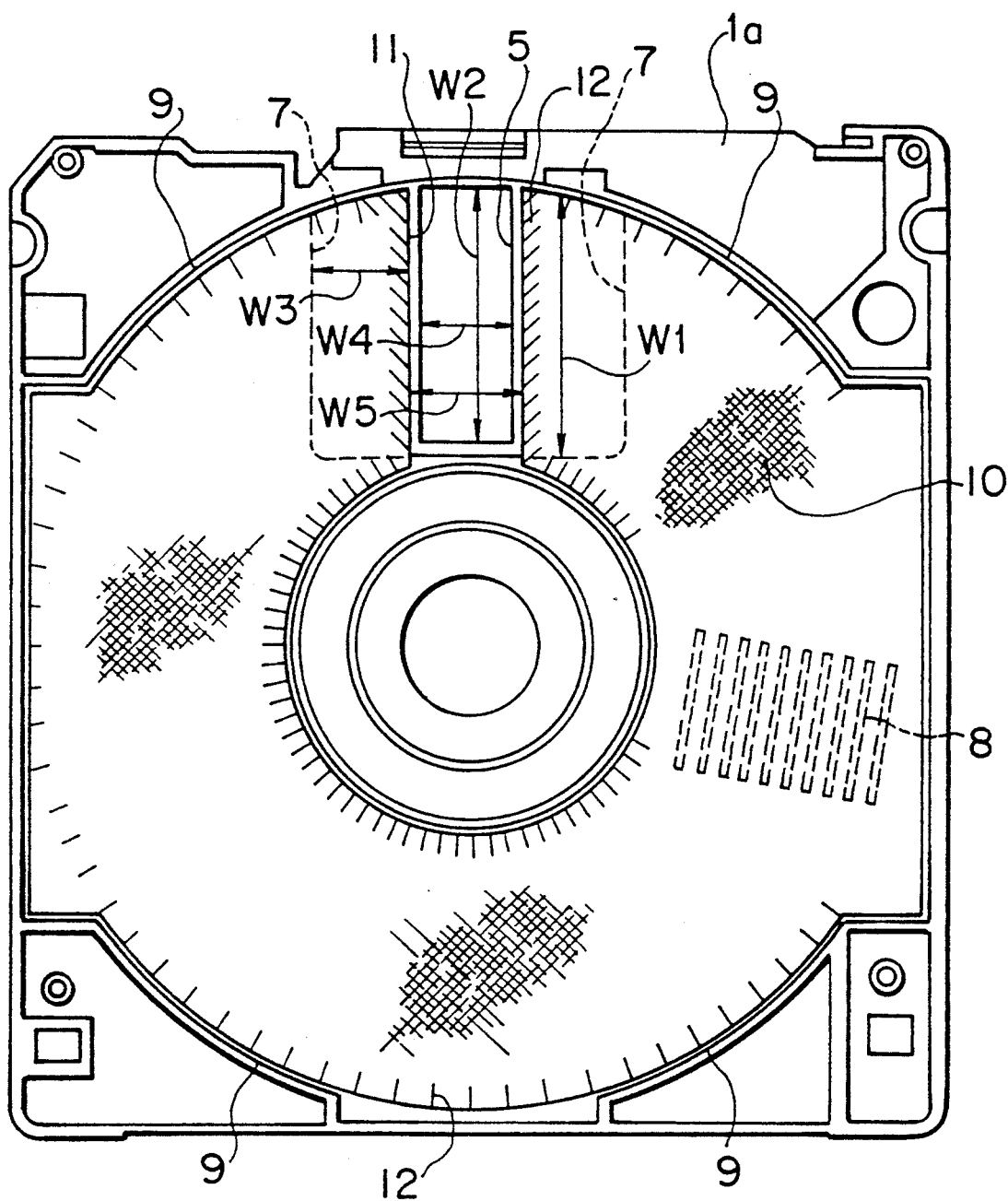
FIG. 2 is a plan view of a floppy disk unit in a condition where a liner is adhered to an upper case.

As shown in FIG. 2, the upper case 1a is formed with spot-facing recesses 7, 7 on the inner surface thereof at both sides of the head window 5. Each of these recesses has a length W1 substantially equal to the length W2 of the head window 5 and a width W3 selected over 0.3 times of the head window width W4, preferably, in a range 0.5 to 1.5 times of the same. Further, the upper case 1a is formed with a plurality of linearly extending projections 8 at the upstream position in, view of the disk rotating direction, two of which are located at both sides and are adapted to be somewhat higher than the other intermediate projections.

The upper case 1a is formed on the inner surface thereof with restricting ribs 9 for determining the position of the magnetic disk when accommodated in the cartridge case. Inside of the restricting ribs 9 is disposed a liner 10 having a C shape. The aperture 11 of the liner 10 formed at the position corresponding to the head window 5 is designed to have a width W5 somewhat greater than the width W4 of the head window 5. By providing this liner 10 on the inner surface of the upper case 1a, the recesses 7 and the projections 8 are covered. The liner 10 is welded to the upper case 1a by means of ultrasonic wave welding along the peripheral portion of the liner 10. Since the recesses 7 of the upper case 1a are sufficiently wide as mentioned above, it is possible, as shown in FIG. 4, to conduct an ultrasonic welding 12 of the edges of the aperture 11 of the liner 10 in the recesses 7.

Figure 3:
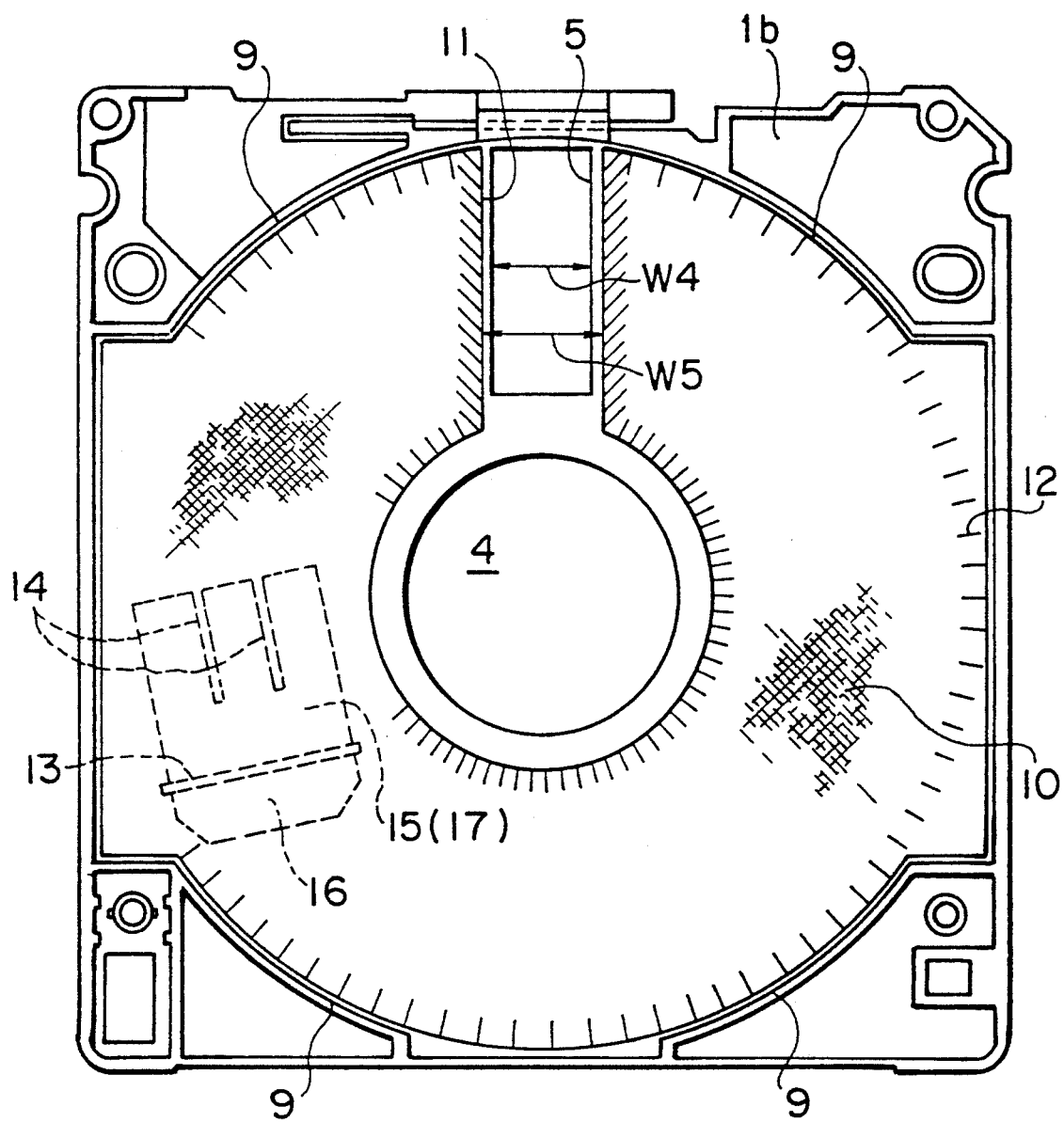
FIG. 3 is a plan view of a floppy disk unit in a condition where a liner is adhered to the lower case.
Figure 5:
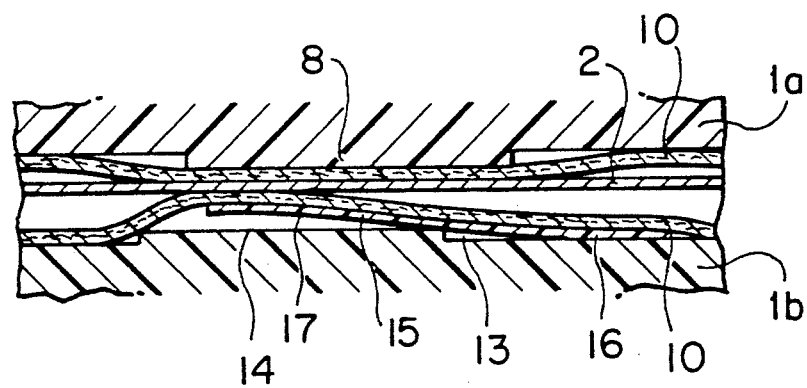
FIG. 5 is an enlarged sectional view of a region around an elastic portion of a cartridge case.

As shown in FIGS. 3 and 5, the lower case 1b is formed on the inner surface thereof with projecting supporter 13 and convex stripes 14 for preventing adhesion at a position corresponding to the position of the above-mentioned projections 8 of the upper case 1a. Further, as shown in FIGS. 3 and 5, the root portion 16 of an elastic member 15 made of a bent plastic sheet is fixed to the inner surface of the lower case 1b at a position near the supporter 13 by a suitable means such as adhesion or heat welding, whereby the free end portion 17 of the elastic member 15 is maintained to have an inclined attitude as being supported by the supporter 13.

The lower case 1b is also formed on the inner surface thereof with restricting ribs 9, and inside of the restricting ribs 9 is disposed a liner 10. The aperture 11 of the liner 10 formed at the position corresponding to the head window 5 is designed to have a width W5 somewhat greater than the width W4 of the head window 5.

By providing this liner 10 on the inner surface of the lower case 1b, the above-mentioned elastic member 15 and other members are covered. The liner 10 is secured to the lower case 1b along the peripheral portion of the liner by means of ultrasonic wave welding 12, excluding the region near the elastic member 15.

Figure 4:
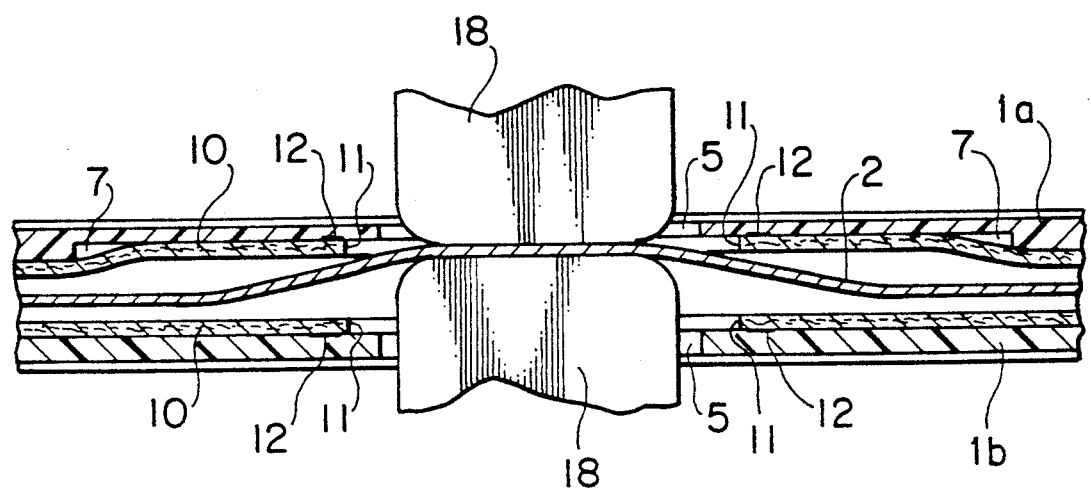
FIG. 4 is an enlarged sectional view of the region around a head window of a floppy disk unit in use.

When a floppy disk unit is assembled by combining the upper case 1a with the lower case 1b, the liner 10 is partially raised from the lower case 1b by means of the elastic member 15, and at the same time, this rising of the liner is suppressed by means of the projections of the upper case 1a, thereby elastically putting a part of the magnetic disk 2 between the upper and lower liners 10. As the magnetic disk rotates, the surface of the disk is cleaned by the liners 10. FIG. 4 shows a condition in use, in which numeral 18 denotes a schematically illustrated magnetic head.

The liner 10 is constituted by a non-woven cloth, the thickness of which is preferred, in case of a 3.5 inch floppy disk unit, to be about 200 μm under the load condition of 73 g/cm$^2$. However, the thickness is not specially limited in the present invention, but can be suitably selected from in a range of 100 to 400 μm according to the kind of the floppy disk unit. There can be various structures of the liner 10, for example, a single layer structure in which the liner is wholly composed of one kind of fiber, two layer structure in which the disk side layer and the case side layer are composed of different kinds of fibers, and three layer structure in which the disk side layer, the intermediate layer and the case side layer are respectively composed of different kinds of fibers. In all cases of the single layer structure and the more than two layer structures, each layer may be composed of combined fibers including more than two kinds of fibers, as well as of a single kind of fiber.

The fibers for composing the liner 10, especially at least the fibers composing the disk side layer in case of a liner including more than two layers, is desired to have low lint and high cleaning features and a relatively high durability (strong against abrasion). There exist fibers having these features, for example, rayon fiber, especially polynosic rayon fibers, polyamide group fibers, combined fiber of rayon fibers and polyamide fibers. In this embodiment, in case of a liner 10 of a single layer structure, the layer is composed of rayon fibers, or combined fibers of rayon fibers and polyamide group fibers, while in case of a liner of more than two layers, at least the fibers composing the disk side layer is composed of rayon fibers, polyamide group fibers, or a combined fibers of rayon fibers and polyamide group fibers. Further, in case of more than two layers, the fibers for the other layers should be selected in consideration of cutting feature, electrostatic elimination feature and so on, and in addition, an affinity with adjacent layer fibers should be taken into consideration.

In this embodiment, at least the fibers forming the disk side layer includes inorganic oxide material, these fibers being prepared by mixing inorganic oxide material with a raw material such as rayon or polyamide and then spinning the mixed material in a known manner. The inorganic oxide material is suitably selected from among titanium oxide, aluminium oxide, silicon oxide, calcium oxide, chromium oxide and so on.

The rayon fiber may be selected from among viscose rayon, copper-ammonia rayon, acetate rayon and so on. Further, for reference, the tensile strength of rayon fiber (staple fiber) is about 2.5 to 3.1 g/D, the elongation is about 16 to 22%, the elongation elastic modulus (at 3% elongation) is about 55 to 80%, and the specific weight is about 1.50 to 1.52. Polyamide group fiber is a fiber having a base monomer of a poly-condensation material of adipic acid and hexamethylendiamine, and various nylons mainly of 6,6-nylon or 6-nylon can be used. Further, for reference, the tensile strength of a polyamide group fiber is about 4.5 to 7.5 g/D, the elongation is about 25 to 60%, the elongation elastic modulus (at 3% elongation) is about 95 to 100%, and the specific weight is about 1.14.

The thickness of the fiber of the liner 10, especially of the fiber in the disk side layer, should be taken into consideration. When the fiber is too thick, the chance of contact between the fiber and dust is decreased, thereby causing an inferior cleaning feature, while when the fiber is too fine, the fibers are too crowded, thereby decreasing spaces for trapping the dust. In the latter case, if the density of the fibers is decreased for avoiding the above-mentioned trouble, there may be problems that the strength of the liner become insufficient and it becomes impossible to prepare a non-woven cloth. After various investigations, the inventors have confirmed that the diameter of the fiber is preferred to be in a range of 10 to 30 $\mu$m, especially in a range of 15 to 25 $\mu$m.

In addition, in the present invention, the magnetic material used for the magnetic layer is not specially limited, but materials prepared by adding a reinforcing powder such as aluminum oxide, chromium oxide, silicon carbide to a ferromagnetic metal powder such as pure iron, cobalt, cobalt-nickel, or cobalt-phosphor, or $\gamma$-$Fe_2O_3$, which has been frequently used in the past, can be also used. The above-mentioned ferromagnetic materials are especially suitable to the magnetic layer including reinforcing powder having high hardness.

Experiments have been conducted as follows.

Specimen 1: A single layer liner 10, which had a thickness 200 $\mu$m under a load condition of 73 g/cm$^2$ and was wholly composed of polynosic rayon fiber of 20 $\mu$m diameter containing titanium oxide powder having an average diameter 0.4 $\mu$m by weight ratio 0.5%.

Specimen 2: A single layer liner 10, which had a thickness 200 $\mu$m and was wholly composed of polyamide group fibers of 20 $\mu$m diameter containing aluminum oxide powder having an average diameter 0.4 $\mu$m by weight ratio 1%.

Specimen 3: A single layer liner 10, which had a thickness 200 $\mu$m and was composed of fibers prepared by combining rayon fibers and polyamide group fibers each having 20 $\mu$m diameter with equal mass ratio, the combined fibers containing titanium oxide powder having an average diameter 0.5 $\mu$m by weight ratio 0.5%.

Reference Specimen: A single layer liner, which had a thickness 200 $\mu$m and was wholly composed of polyester fiber of 20 $\mu$m diameter.

Frictional coefficients of these liners have been measured as being slided on a polyethylene terephthalate (PET) sheet under a load condition of 50 g/cm$^2$. The results obtained by this experiment are shown in Table 1.

TABLE 1

|  | Frictional Coefficient |
|---|---|
| Specimen 1 | 0.25 |
| Specimen 2 | 0.31 |
| Specimen 3 | 0.27 |
| Reference Specimen | 0.41 |

In addition, the specimens 1, 2 and 3 and the reference specimen have been incorporated into a floppy disk unit of 3.5 inches type, and a disk has been rotated with a rotary speed of 360 rpm for 24 hours. Then, the degree of the damage of each liners has been measured. The results have been appreciated by dividing the liner area contacting with the magnetic disk into 100 equal portions and counting the percentage of the welded or abrased portions thereamong. A metal disk, in which the magnetic layer was composed of pure iron and the reinforcing powder was composed of aluminium oxide, has been used. The results are shown in Table 2.

TABLE 2

|  | Degree of Damage |
|---|---|
| Specimen 1 | 10 |
| Specimen 2 | 13 |
| Specimen 3 | 12 |
| Reference Specimen | 70 |

As obvious from Tables 1 and 2, the frictional coefficients of the specimens 1, 2 and 3 are small in comparison with that of the reference specimen, and the damage degrees are also significantly improved. Further, not only the percentage of the damage but also the severity of the damage has been confirmed to be improved.

As for the before-mentioned base film 13, a synthetic resin film composed of such as polyethylene-terephthalate (PET), polyethylene-naphthalate (PEN) or polyimide was used.

The above-mentioned magnetic layer 14 was constituted by a combination of ferromagnetic powder, binder, lubricant, and reinforcing powder.

As for the above-mentioned binder, there were used, for example, vinyl chloride-vinyl acetate copolymer, vinyl chloride-vinyl acetate-vinyl alcohol copolymer, urethane resin, polyisocyanate compound and so on.

As for the above-mentioned lubricant, there could be used, for example, a high fatty acid such as stearic acid or oleic acid, a high fatty acid ester, liquid paraffin, squalene, fluorocarbon polymer and so on. The addition rate of the lubricant was suitably selected from in a range of 1 to 25 weight percentages relative to the above-mentioned ferromagnetic metal powder.

The addition rate of the reinforcing powder was suitably selected from in a range of 1 to 25 weight percentages relative to the above-mentioned ferromagnetic metal powder.

Examples for compositions of magnetic coating materials are shown below.

| Example 1 for magnetic coating composition | |
|---|---|
| $\alpha$-Fe | 100 weight portion |
| (Hc: 1650 Oe, Saturation Magnetization: 135 emu/g Average length of Particles along Major Axis: 0.25 $\mu$m, Average Axis Ratio: 8) | |
| vinyl chloride-vinyl acetate-vinyl alcohol copolymer, | 14.1 weight portion |
| urethane resin | 8.5 weight portion |
| three functional isocyanate compound | 5.6 weight portion |
| alumina powder (average powder diameter: 0.43 $\mu$m | 20 weight portion |
| carbon black | 2 weight portion |
| oleyl olate | 7 weight portion |
| cyclohexanone | 150 weight portion |
| toluene | 150 weight portion |

| Example 2 for magnetic coating composition | |
|---|---|
| barium ferrite | 100 weight portion |
| (HC: 530 Oe, Saturation Magnetization: 57 emu/g | |

-continued

| | |
|---|---|
| Average powder diameter: 0.04 μm) | |
| vinyl chloride-vinyl acetate-vinyl alcohol copolymer, | 11.0 weight portion |
| urethane resin | 6.6 weight portion |
| three functional isocyanate compound | 4.4 weight portion |
| alumina powder (average powder diameter: 0.43 μm) | 15 weight portion |
| carbon black | 2 weight portion |
| oleyl olate | 7 weight portion |
| cyclohexanone | 150 weight portion |
| toluene | 150 weight portion |

The compositions of the Examples 1 and 2 for magnetic coating material have been sufficiently mixed in a ball mill, and then coated on both sides of a base film composed of polyethylene terephthalate (PET) and having 75 μm thickness, the coating composition being adapted so as to have 0.7 μm thickness when dried. After being dried, each of the compositions was subjected to a calender treatment, thereby producing magnetic layers 14 having a surface roughness Ra (0.08 mm cut off) of below 0.01 μm.

As mentioned above, the present invention can provide a floppy disk unit including liners, each of which has a superior durability and can suppress the occurances of errors as sharply as possible.

What is claimed is:
1. A floppy disk unit comprising:
   a cartridge case of a jacket;
   a flexible magnetic disk rotatably accommodated in the cartridge case or the jacket; and
   liners disposed on an inner surface of the cartridge case or jacket,
   at least the surface layer of each of said liners in sliding contact with the magnetic disk being made from a fiber material containing inorganic oxide material powder having an average diameter of 0.01 to 1 μm by weight ratio 0.1 to 10% for enhancing a mechanical strength of fibers in the fiber material.
2. A floppy disk unit claimed in claim 1, wherein said fibers in said surface layer are rayon fibers.
3. A floppy disk unit claimed in claim 1, wherein said fibers in said surface layer are polyamide group fibers.
4. A floppy disk unit claimed in claim 1, wherein said fibers in said surface layer are polyester fibers.
5. A floppy disk unite claimed in claim 2, wherein said rayon fiber is polynosic rayon and said inorganic oxide material is titanium oxide.
6. A floppy disk unit claimed in claim 1, 2, 3, 4, or 5, wherein each of said fibers in said liners has a diameter of 10 to 30 μm.

* * * * *